Figure 1:
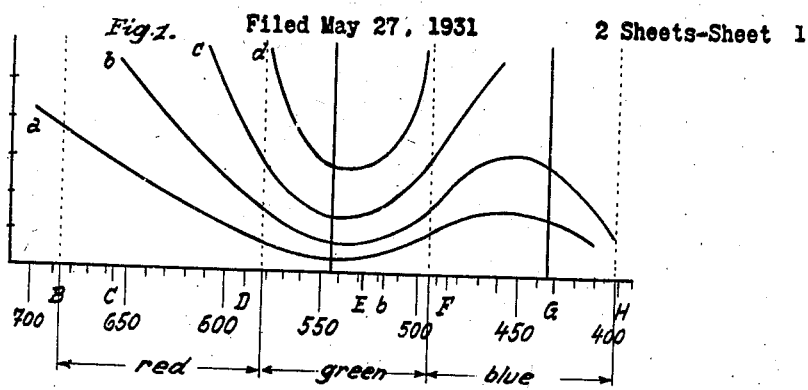

Feb. 6, 1934.  H. BERTLING  1,945,768

PROCESS FOR LOWERING THE CONSUMPTION OF LIGHT IN COLOR PHOTOGRAPHY

Filed May 27, 1931   2 Sheets-Sheet 2

Patented Feb. 6, 1934

1,945,768

UNITED STATES PATENT OFFICE 1,945,768

PROCESS FOR LOWERING THE CONSUMPTION OF LIGHT IN COLOR PHOTOGRAPHY

Herbert Bertling, Berlin, Germany, assignor to Kurt Dicken, Berlin - Charlottenburg, Germany Application May 27, 1931, Serial No. 540,451, and in Germany June 7, 1930

4 Claims. (Cl. 95—2)

The present invention relates to a process for lowering the consumption of light in color photography.

The production of polychromatic photographic images by preparing monochromatic partial images with the aid of filters and then combining these partial images, is known.

In the three-color method, for example, the monochromatic partial images, which reproduce the red, green and blue portions of the image, are prepared by means of red, green and blue filters. The technique of the three-color method of color photography is based on the assumption that the spectrum consists of three primary colors, the spectrum being divided as follows into three parts: the red part which comprises the spectrum from about 6900 to 5800 Angstrom units, the green portion from 5800 to 4950 and the blue portion from 4950 to 4000 Angstrom units. According to the present technique of the three-color method of color photography either dry filters or liquid filters may be used. The liquid filters are containers of a suitable shape filled with solution of dyestuffs having a definite curve of absorption and being therefore capable of retaining the colors desired. The so-called dry filters consist of mixtures of gelatine and solutions of dyes, the dried layers of which are placed between glass plates and which have the same functions as liquid filters. The function of the red, green and blue filters is to isolate the before mentioned three portions of the spectrum—red, blue and green— from the spectrum and for this reason they must only be pervious to the light rays of these zones of the spectrum. There may also be used so-called negative filters. These are also liquid filters or dry filters; their composition and properties of dyes, however, must be selected in such a way that they keep back the green rays for instance in the case of a green negative filter, but are pervious to all other light rays, while in the case of a blue negative filter the blue rays are kept back or absorbed and all other light rays are allowed to pass. A filter works the more correct, the greater is its selectivity. Thereby the property is meant according to which the respective filter does not absorb any of the desired light rays, if possible, allowing them all to pass, while it absorbs or retains as completely as possible all light rays which are not desired. In the case of negative filters, the conditions are of course just the reverse. Selectivity of the filters to the degree desirable in the practice, owing to the smooth course of their absorption bands, can only be attained by imparting great color density to them. With increase in the concentration of dyestuffs, the color density of the filter is increased and the absorption of certain zones of the spectrum by the filter can be more complete. The desired selectivity of the filters therefore requires a great color density and the latter is attained by sufficiently increasing the concentration of the dyestuffs in the solution employed or in the dry filter used. With increase in selectivity, the so called filter aperture is decreased, that is to say the filter will be in a better position only to allow certain rays to pass. With increase in the color density, the transparency of the filter is lessened. Therefore, strongly selective filters show a low transparency and this drawback can only be equalized by considerable expenditure of light or long exposure. In the technique of cinematograph color film photography this is of very material importance. In the technique of cinematograph color film photography instantaneous photographs are taken so that any deficient transparency of the filters can only be equalized by strengthening the sources of light. In view of the enormous consumption of light involved in the taking of cinematograph color films this leads to a considerable increase of the consumption of light, so that any saving in the latter is of very material value.

The invention will now be described with reference to the accompanying diagrammatic representations.

Figure 2:
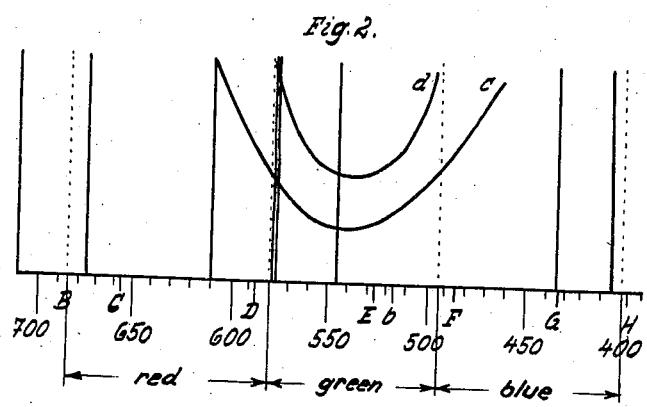
Figure 3:
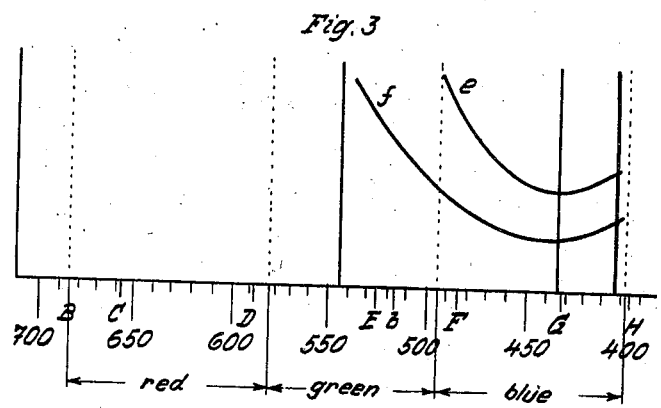
Figure 4:
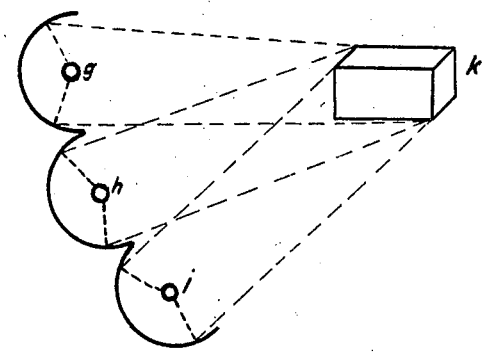
Figure 4:
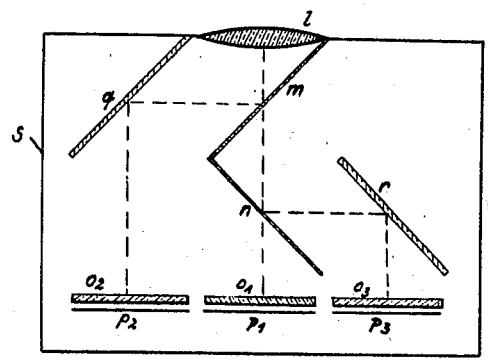

Fig. 1 shows the division of the spectrum into the three spectrum zones. Fig. 2 shows the steps which must be taken to carry the process into effect. Fig. 3 shows the procedure in producing a blue partial image according to this invention. Fig. 4 shows diagrammatically an arrangement for the production of three monochromatic partial images.

Figure 1 shows the division of the spectrum into the three spectrum zones: red, green and blue. In order to show the dependence of the transparency on the color density, the absorption spectra of naphthol green are recorded for different color densities, in the ratio of $n=1:2:4:8$. The curves $a$, $b$, $c$, and $d$ show the absorption spectra. The curve $a$ shows the absorption spectrum for an assumed color density $n=1$, the curves $b$, $c$ and $d$ show the absorption spectra for color densities which are $n=2$, 4, or 8 times as high as the color density assumed as basis. It is evident that it is only when the color density is $n=8$ that the filter aperture becomes so small that the green portion of the spectrum is completely isolated by the naphthol green containing layer. At the same time it is evident that owing to the use of this high color density, the transparency of the filter is lessened, since the absorption of the green rays is also increased. If the color density is decreased, the transparency of the filter aperture becomes larger, the result of which would be that also blue and red rays would pass to a certain extent through the naphthol green filter and would be capable of illuminating the green partial image, so that the latter would also record blue and red colors. This must, however, in no case happen.

According to the present invention considerable economy in light is to be effected by the use of highly transparent filters without detrimentally influencing the selectivity of the monochromatic partial images. This is attained by the use of sources of selective light which possesses a discontinuous spectrum, such as for example mercury vapor lamps, neon lamps and thallium lamps in combination with highly transparent filters.

I have found that it is not necessary to utilize light rays of all wave lengths, when making partial images for the polychromatic photography, but that monochromatic partial images for the polychromatic photography can be produced with the aid of monochromatic light, provided the emulsion is sensitized for such monochromatic light. It is possible to produce the monochromatic partial images for the polychromatic photograph with the aid of monochromatic light, provided the filters allow this light to pass. Accordingly, the red light is to be essentially produced with monochromatic red light, the green image essentially with monochromatic green light, and the blue image essentially with monochromatic blue light. If these three sources of light are combined, white light results, from which the individual filter selects its own appropriate monochromatic light. An essential feature of this invention consists in using a source of light for the production of the photographs which is obtained by combining several, essentially monochromatic sources of light, yielding an almost white light, from which the individual filters which will be described hereafter, select their own appropriate monochromatic light.

In Figure 2 it is shown what steps must be taken to carry the process into effect. It is shown how the green partial image is taken with the aid of a naphthol green filter. As light source lithium lamps are employed for the red rays, and mercury vapor lamps for the green and blue rays. The lithium spectrum consists of two lines having a wave length of about 6100 and 6750 Angstrom units whilst the red portion of the spectrum, with regard to the three-color method of photography, lies between 6900 and 5800 Angstrom units. The lithium line of 6100 Angstrom units thus still lies very far from the limit of the green spectrum zone, a fact which is of importance in carrying out the process. In the green zone of the spectrum the green mercury line of 5460 Angstrom units and the two yelow lines of 5770 and 5790 are effective. The blue light is produced by the blue mercury lines of 4360 and 4040 Angstrom units.

In Figure 2 the lithium lines of 6750 and 6100 Angstrom units, and only the photographically active mercury lines of 5460, 5770, 5790, 4360 and 4040 Angstrom units are recorded. The ordinates indicate the absorption values of the filter. When using light sources with continuous band spectra or many line spectra, such as for instance ordinary arc light lamps, the filter aperture of the naphthol green filter must not exceed the zone of 5800 to 4950 Angstrom units. The absorption spectrum in this case corresponds with the curve $d$, which at the same time indicates the poor transparency of the filter. However, in carrying out the invention, the great distance of the mercury line of 4360 Angstrom units and of the lithium line of 6100 Angstrom units from the green zone of the spectrum, enables the filter aperture to be increased by lowering the color density, which is combined with an increase in transparency without the green image being illuminated by the red or blue rays. The curve $c$ shows the carrying out of the invention with the diminution of the color density to one half. It is apparent that the individual absorption of the filter is lowered by a half without the blue and red zones of the spectrum influencing the green image owing to the increased aperture of the filter.

Figure 3 shows the procedure in producing a blue partial image according to this invention, by using toluidine blue as filter color. Curve $e$ shows the filter aperture when using normal sources of light, curve $f$ the increased filter aperture after reducing the color density to about a half, when using, according to this invention, a source of light combined from monochromatic lamps. In this case also the blue zone of the spectrum is not influenced by green light.

A similar procedure is followed with the red portion of the spectrum.

In Figure 4 an arrangement is shown by way of example for the production of the three monochromatic partial images for the three-color photography. As sources of light the three lamps $g$, $h$ and $i$ are used, of which $g$ may be a mercury vapor lamp, $h$ a thallium lamp and $i$ a neon lamp. $k$ is the colored object the photograph of which is to be taken. $s$ is the photographic camera which takes simultaneously the three partial images. Through the lens $l$ the rays of light, which are indicated in broken lines, fall on the non-coated transparent silver mirror $m$, passing the mirror partly and falling on the non-coated mirror $n$, which they also pass partly and, after having passed the filter $o_1$ striking the film $p_1$ on which the latent silver image is produced. The silver surface of the mirror $m$ reflects one portion of the rays on to the coated silver mirror $q$ and from there they pass through the filter $o_2$ to the film $p_2$. Another portion of the rays, after passing the mirror $m$ are reflected by the surface of the mirror $n$ on to the coated mirror $r$ from where they pass through the filter $o_3$ to the film $p_3$. Supposing $o_1$ be a blue filter, $o_2$ a green filter and $o_3$ a red filter, a blue filter image is produced on film $p_1$, the green filter image on $p_2$ and the red filter image on $o_3$. These three filter images yield the three-color image. The filters $o_1$, $o_2$ and $o_3$ are highly transparent and have larger filter apertures as described. The combined source of light consisting of mercury-, thallium and neon lamps shows a strongly discontinuous spectrum allowing the use of large filter apertures.

The process according to this invention is not limited to definite sources of light. The chief consideration is to use selective single light sources, the spectrum lines of which must be separated from one another as far as possible, so that large filter apertures can be employed. Instead of the lithium lamp a neon lamp may, for example, be employed, the spectrum of which consists of a large number of lines, the photographically active lines of which lie between 6700 and 5960 Angstrom units. The distance between the extreme neon line of 5950 Angstrom units from the green mercury line of 5460 Angstrom units is, however, not so great as the distance from the lithium line of 6100 Angstrom units, for which reason, when employing neon light, greater color density must be employed for the green filter in order to diminish the filter aperture.

The neon light, however, offers many other advantages which appear to justify its application.

The three-color process has been described by way of example. The present process may however, of course, also be applied to the two- and poly-color photography.

Thallium- and magnesium-vapor lamps are also suitable for the present process. Thallium lamps emit an essentially monochromatic green light of 5350 Angstrom units and this spectrum line is very favorable for the purposes of this invention.

The magnesium lines of 5150 Angstrom units and 4680 Angstrom units also allow a high transparency, particularly of the green filters. It is possible to combine the before mentioned individual sources of light in accordance with the existing requirements in any desired manner and to use also other selective lamps.

In addition to the combinations described, the following combinations may also be used: Lithium- and magnesium lamps, neon- and magnesium lamps, neon-, thallium-, and mercury lamps, lithium-, thallium- and mercury lamps, neon-, thallium- and magnesium lamps, lithium-, thallium- and magnesium lamps, neon-, thallium- and magnesium lamps, neon-, thallium-, magnesuim- and mercury lamps, lithium-, thallium-, magnesium- and mercury lamps.

I claim:

1. In the art of color photography the method of producing a plurality of monochromatic partial images of an object to be photographed which comprises interposing between the object and a light-sensitive film a plurality of light filters having relatively wide spectral apertures and correspondingly high light transmission coefficients and illuminating said object with light of discontinuous spectral character containing lines or bands of light of wave lengths corresponding to the central portions of the spectral apertures of each of said filters and being substantially free from lines or bands of light of wave lengths corresponding to the outer portions of the spectral apertures of said filter exposing the film to the light passing through said filters and thereafter developing the film.

2. In the art of color photography the method of producing a plurality of monochromatic partial images of an object to be photographed which comprises interposing between the object and a light-sensitive film a plurality of light filters having relatively high light transmission coefficients and partially overlapping spectral apertures, and illuminating said object with light of discontinuous spectral character containing lines or bands of light of wave lengths corresponding to the non-overlapping portion of the spectral apertures of each of said filters and being substantially free from lines or bands of light of wave lengths corresponding to the overlapping portions of the spectral apertures of said filters, exposing the film to the light passing through said filters and thereafter developing the film.

3. In the art of color photography the method of producing a plurality of monochromatic partial images of an object to be photographed which comprises interposing between the object and a light-sensitive film a plurality of light filters having relatively wide spectral apertures and correspondingly high light transmission coefficients and illuminating said object with substantially white light of discontinuous spectral character containing lines or bands of light of wave lengths corresponding to the central portions of the spectral apertures of each of said filters and being substantially free from lines or bands of light of wave lengths corresponding to the outer portions of the spectral apertures of said filter, exposing the film to the light passing through said filters and thereafter developing the film.

4. In the art of color photography the method of producing a plurality of monochromatic partial images of an object to be photographed which comprises interposing between the object and a light-sensitive film a plurality of light filters having relatively high light transmission coefficients. and partially overlapping spectral apertures, and illuminating said object with substantially white light of discontinuous spectral character containing lines or bands of light of wave lengths corresponding to the non-overlapping portion of the spectral apertures of each of said filters and being substantially free from lines or bands of light of wave lengths corresponding to the overlapping portions of the spectral apertures of said filters, exposing the film to the light passing through said filters and thereafter developing the film.

HERBERT BERTLING.